United States Patent [19]

Pfeifer et al.

[11] 3,711,520

[45] Jan. 16, 1973

[54] FLAME RETARDANT COMPOSITIONS

[75] Inventors: Charles W. Pfeifer, Schenectady, N.Y.; William J. Bobear, Latham, both of N.Y.

[73] Assignee: General Electric Company

[22] Filed: Sept. 4, 1970

[21] Appl. No.: 69,982

[52] U.S. Cl. .................... 260/375 B, 260/DIG. 24
[51] Int. Cl. ............................................. C08g 51/04
[58] Field of Search ..... 260/37 SB, 46, 75 R, DIG. 24

[56] References Cited

UNITED STATES PATENTS

| | | | |
|---|---|---|---|
| 3,514,424 | 5/1970 | Noble et al. | 260/37 SB |
| 3,269,981 | 8/1966 | Goossens | 260/37 SB X |
| 3,137,670 | 6/1964 | Maneri | 260/37 SB |
| 3,468,838 | 9/1969 | Loraine et al. | 260/37 SB |
| 3,539,530 | 11/1970 | Karstedt | 260/37 SB X |
| 2,575,687 | 11/1951 | Simon et al. | 260/37 SB X |
| 3,261,801 | 7/1966 | Wormuth | 260/37 SB |

OTHER PUBLICATIONS

Oleesky; Handbook of Reinforced Plastics, Reinhold Publishing Corp.; 1964; page 460; Sci. Lib., TA 455.P55 Q4.

Primary Examiner—Lewis T. Jacobs
Attorney—Donald J. Voss, Donavon L. Favre, Frank L. Neuhauser, Oscar B. Waddell and Joseph B. Forman

[57] ABSTRACT

A silicone elastomer stock which exhibits improved flame resistance in the cured state consists essentially of a silicone elastomer, a filler, a small amount of a flame retardant material selected from the group consisting of platinum and platinum compounds and a Group II metal oxide.

11 Claims, No Drawings

FLAME RETARDANT COMPOSITIONS

BACKGROUND OF THE INVENTION

This invention relates to organopolysiloxane compositions having improved flame retardant properties. More particularly, this invention is concerned with a composition of mater which, in the cured state, exhibits improved flame retardant properties and which comprises (1) organopolysiloxane gum convertible to the cured solid, elastic state and consisting essentially of silicon atoms, oxygen atoms and organic groups selected from the class consisting of methyl radicals, aromatic radicals selected from the class consisting of aryl and halogenated aryl radicals, vinyl radicals, lower alkyl radicals, lower cyanoalkyl radicals and lower haloalkyl radicals, (2) a finely divided inorganic filler, (3) a platinum compound or platinum and (4) a Group II metal oxide.

A method for improving the flame retardancy of a silicone rubber is shown in U.S. Pat. No. 3,514,424, Noble et al., where a platinum compound or platinum is combined with other components of a silicone rubber to impart flame retardancy. While the addition of platinum or platinum compound does improve the flame retardancy of silicone rubbers and is entirely adequate for most uses, the rubbers produced according to the Nobel et al. patent lack, to a degree, heat reversion resistance when a high platinum level is employed, and they are not as flame retardant as might be desired in some applications.

SUMMARY

In accordance with the present invention, it has been discovered that by incorporating a small amount of a Group II metal oxide, preferably zinc oxide, in combination with a platinum compound or platinum in a filled silicone rubber composition that the flame retardancy of the silicone rubber is markedly improved.

DESCRIPTION OF THE PREFERRED EMBODIMENTS

The organopolysiloxane which is convertible to the cured, solid, elastic state can be any of the organopolysiloxane gums known in the art which fall within the composition range stated above and have a viscosity of from about 5,000,000 to 50,000,000 centistokes. These organopolysiloxanes are advantageously obtained by condensing a diorganodihydrolyzable silane, for example, dimethyldichlorosilane with or without small amounts of monoorganotrihydrolyzable silanes or triorganomonohydrolyzable silanes, for example methyltrichlorosilane, trimethylchlorosilane, etc., and thereafter effecting condensation of the hydrolysis product using a condensing agent, for instance, an alkaline condensing agent, such as potassium hydroxide, sodium hydroxide, etc., or an acidic condensing agent, such as ferric chloride, etc. Alternately, cyclic polymers of dimethylsiloxane can be condensed with an alkaline condensing agent to give the desired organopolysiloxane which is convertible to the cured, solid, elastic state. Whatever the method of formulation of the convertible organopoly-siloxane, the final material can contain up to 35 mole per cent of phenyl radicals bonded by silicon-carbon links and up to 2 per cent of vinyl radicals bonded through silicon-carbon links. Thus, when the convertible material is formed by hydrolysis a portion of the starting material can be diphenyldihydrolyzable silane, methylphenyldihydrolyzable silane, methylvinyldihydrolyzable silane, divinyldihyrolyzable silane, etc., or the monoorganotrihydrolyzable or triorganomonohydrolyzable silanes containing these radicals.

It is essential to the production of truly flame retardant compositions that a quantity of a filler be present. In general, any filler system which is residually non-alkaline, i.e., acid or neutral, can be employed. Any of the finely divided silica fillers generally used for silicone rubber, such as silica aerogel, fumed silica ground quartz, and finely divided silica treated with organosilicon materials, e.g., trimethylchlorosilane, etc., can be employed. The treatment of silica fillers with organosilicon materials are as described, e.g., in U.S. Pat. Nos. 2,938,009—Lucas and 3,004,859—Lichtenwalner. The amount of filler present can vary within wide ranges, from 10 to 300 parts of filler per 100 parts of the organopolysiloxane gum. Preferably, the filler is present in an amount of from 40 to 125 parts per 100 parts of the organopolysiloxane gum. Up to about two-thirds of the total silica filler can be replaced by such materials as carbon black, titanium dioxide, or diatomaceous earth, or a combination of these materials, so long as a residual alkalinity in the filler system does not result. However, while clay has often been employed as a filler for silicone rubber, it has unexpectedly been found that convertible organopolysiloxane materials filled with alkaline clay, alone, do not exhibit the flame retardancy shown by the materials filed with a finely divided silica or a mixture of silica with one or more of the other materials mentioned previously.

Any of the residually non-alkaline metal oxides of Group II may be used to replace the filler in whole or in part. The preferable filler replacement material is zinc oxide.

The platinum-containing material which is used is, as previously mentioned, any of the materials generally utilized in SiH+Si-olefin reactions. Among the forms of this platinum are elemental platinum as shown in U.S. Pat. No. 2,970,150—Bailey and platinum-on-charcoal, platinum-on-gamma-alumina, platinum-on-silica gel, platinum-on-asbestos, and chloroplatinic acid,

$(H_2PtCl_6 \cdot 6H_2O)$ as mentioned in U.S. Pat. No. 2,823,218–Speier. Further, the platinum-containing material can be selected from those having the formula $(PtCl_2 \cdot olefin)_2$ and $H(PtCl_3 \cdot olefin)$, as described in U.S. Pat. No. 3,159,601 – Ashby. The olefin shown in the previous two formulas can be almost any type of olefin, but is preferably an alkene having from two to eight carbon atoms, a cycloalkene having from five to seven carbon atoms or styrene. Specific olefins utilizable in the above formulas are ethylene, propylene, the various isomers of butylene, octylene, cyclopentene, cyclohexene, cycloheptene, etc. A further platinum-containing material usable in the composition of the present invention is the platinum chloride cyclopropane complex $(PtCl_2 \cdot C_3H_6)_2$ described in U.S. Pat. No. 3,159,662 – Ashby.

Still further, the platinum-containing material can be a complex formed from chloroplatinic acid with up to 2 moles per gram of platinum of a member selected from the class consisting of alcohols, ethers, aldehydes and mixtures of the above as described in U.S. Pat. No. 3,220,972—Lamoreaux.

The preferred platinum compound to be used as a flame retardant additive is that disclosed in French Pat. No. 1,548,775 of Karstedt. Generally speaking, this type of platinum complex is formed by reacting chloroplatinic acid containing 4 molecules of water of hydration with tetra-methyl-tetravinylcyclotetrasiloxane in the presence of sodium bicarbonate in an ethanol solution.

A large number of other platinum compounds, including complexes which are conventionally and generally widely known in the field, of SiH-olefin addition reactions are also useful in the practice of the present invention.

Small but effective amounts of the platinum compound are sufficient to impart the desired flame retardancy to the silicone rubber. In general, amounts of from less than one to more than 250 parts per million as platinum based on the organopolysiloxane gum can be used. Preferably, the amount is from less than 1 ppm to about 25 ppm as platinum based on the organopolysiloxane gum. When the gum is a methyl and phenyl-containing gum, it is preferable that less than 1 ppm of platinum be used in order to prevent damage due to heat aging of the final product.

The platinum or platinum compound can be employed in amounts greater than 250 parts per million but due to the cost of the materials, utilization of greater than 250 ppm is not preferred as the increased amounts do not provide significant improvement in the flame retardancy of the final material.

It is particularly surprising that the presence of a Group II metal oxide, particularly zinc oxide, should be found in conjunction with the platinum or platinum compound to enhance the flame retardancy imparted by the platinum or platinum compound.

The Group II metal oxides which may be employed in the practice of the present invention include beryllium oxide, magnesium oxide, calcium oxide, strontuim oxide, barium oxide, radium oxide, zinc oxide, cadmium oxide, and mercuric oxide. The amounts as each of the oxides to be added varies with the alkalinity of the oxide. Zinc oxide, the preferred material, is preferably added in an amount of from 1 to 15 parts per hundred parts based upon 100 parts of gum. This amount, however, can vary from a small but effective amount, less than 1 part to greater than 100 parts, per 100 parts of gum. Magnesium oxide is preferably employed in the range of 0.1 to 1.0, such as 0.4 part per 100 parts of gum. It is not recommended that greater than 1 part of magnesium oxide be employed. Magnesium oxide is generally employed in a concentration of 0.2 to 0.6 part. Zinc oxide, on the other hand, is employed generally in a concentration of about 1 to about 100 parts and preferably about 1 to about 15 parts, per 100 parts of gum.

While the previously described organopolysiloxane gum, silica filler or combination of silica filler with others of the enumerated fillers, and platinum-containing material and Group II metal oxide are essential to the production of the flame retardant silicone rubber composition, other materials can be added without impairing this flame retardant property. Some of these additional materials may even enhance the flame retardancy. Among the additional materials which can be added are rubber process aids, such as alkoxy-containing, hydrocarbon-substituted polysiloxane fluids as described in U.S. Pat. No. 2,954,357—Fekete and hydroxylated silanes as described in U.S. Pat. No. 2,890,188—Konkle et al. Additionally, resinous organopolysiloxane materials such as those formed from tetrafunctional alkysilicates, triorganomonofunctional silanes, and, in some cases, difunctional diorganosilanes, as disclosed and claimed in U.S. Pat. No. 2,857,356—Goodwin, Jr., can also be employed.

The order of addition of the various components to the composition is immaterial. All can be added simultaneously or the Group II metal oxide and filler, the platinum compound or platinum and additional materials when they are present can be added at varying times to the organopolysiloxane gum and a homogeneous blend obtained. Following blending of the various materials, the material is cured using any of various curing agents as, for example, benzoyl peroxide, tertiary butyl perbenzoate, bis-(2,4-dichlorobenzoyl)peroxide, etc. These curing agents can be present in varying amounts ranging from about 0.3 percent to as high as 6 to 10 percent by weight, or more, based on the weight of the organopolysiloxane gum. Further, the convertible organopolysiloxane gum can be cured by any other method known in the art without adversely affecting the flame retardant properties imparted by the filler and platinum-containing material. Cure is accomplished with the various peroxide and perbenzoate catalysts by heating with slight pressure at from about 100°C to 200°C for times ranging from 5 to 15 minutes. In addition to, or instead of this press cure, the silicone rubber composition can be treated at temperatures of from about 200°C to 500°C for sufficient time to assure complete conversion of the polysiloxane gum to a substantially infusible and insoluble state.

The process of the present invention will now be more fully illustrated. These illustrations should not be considered as limiting in any way the full scope of the present invention as covered in the appended claims.

The platinum compound which was used to impart flame retardancy in the rubbers produced in the following examples was produced by the following procedure. Into a reaction vessel was placed 74 parts of tetravinyltetramethylcyclotetrasiloxane, 4.5 parts of sodium bicarbonate and the reaction vessel was purged with nitrogen gas for 15 minutes and a nitrogen blanket was maintained over the reaction mixture throughout the process. Then, 3.7 parts of chloroplatinic acid containing 4 molecules of water of hydration and 17.8 parts of ethanol were added. The mixture was slowly heated to 55°C with vigorous agitation and held at 55°C for 30 to 45 minutes. The mixture was then refluxed for 15 to 30 minutes. A reaction product which formed was then vacuum stripped and filtered.

EXAMPLE 1

A formulation was prepared containing a dimethylvinyl chain-stopped polydiorganosiloxane gum having a viscosity of $15 \times 10^6$ centistokes and containing 5.3 mole per cent methylphenylsiloxy units, 0.2 mole per cent of methylvinylsiloxy units and the remainder dimethylsiloxy units and containing vinyl groups on the terminal siloxy units, 35 parts fumed silica, 5 parts of octamethylcyclotetrasiloxane, 7 parts of a methoxy-stopped polymer having a viscosity of 10 centistokes, 0.333 part of the silanol-stopped fluid having a viscosity of 40 centistokes and 0.246 part of a solution containing 1 part of the above-described platinum complex dissolved in 10 parts of a vinyl chain-stopped silicone oil having a viscosity of about 10 centistokes. The formulation was divided into two fractions. To one fraction was added 15 parts of zinc oxide product No. XX-78 obtained from the New Jersey Zinc Company.

Both fractions were catalyzed with a 50% solution of dichlorobenzoyl peroxide in a silicone oil having a viscosity of 1,000 centistokes. Both fractions were then press-cured, baked at 1 hour at 400°F and then tested by holding a strip of the rubber formed edgewise three-fourths inch above a Bunsen burner top in a 1½ inch high flame for 12 seconds after which the extinguishing time in seconds was recorded. The fraction containing the zinc ozide had an extinguishing time of 4 seconds using a natural gas blue flame at 2,000°F. The rubber produced by the reaction containing no zinc oxide had an extinguishing time of 10 seconds using identical conditions.

EXAMPLES 2, 3, 4, 5, 6 and 7

The following table shows the results of adding various quantities of zinc oxide to the same gum formulation outlined in Example 1. The peroxide catalyst used in Examples 2 through 7 was the same, dissolved in the same solvent as was used in Example 1.

| Example | 2 | 3 | 4 | 5 | 6 | 7 |
|---|---|---|---|---|---|---|
| Gum Formulation | 100 | 100 | 100 | 100 | 100 | 100 |
| Zinc Oxide | 0 | 1 | 2 | 5 | 10 | 15 |
| Cadox TS-50 (peroxide catalyst) | 1 | 1 | 1 | 1 | 1 | 1 |
| Extinguishing Time, sec.—Propane, Blue, Slight Yellow in Cone Tip—1640°F | 22 | 7 | 10 | 6 | 5 | 5 |

EXAMPLE 8

A silicone rubber was made using the following formulation. The formulation contained 100 parts of a vinyl chain-stopped polydimethylsiloxane gum having a viscosity of 40,000,000, 3 parts of a 10 centistoke methoxy-stopped polydimethylsiloxane fluid, 4 parts of a silanol-stopped polydimethylsiloxane fluid having a viscosity of 40 centistokes, 37 parts of a fumed silica, 0.25 parts of the platinum complex solution of Example 1, 20 parts of Cadox XX-78 zinc oxide and 1.2 parts of the dibenzoyl peroxide catalyst dissolved in silicone oil described in Example 1. The formulation was press-cured using a catalyst, 1.2 parts of a composition containing benzoyl peroxide and a polydimethylsiloxane fluid having a viscosity of 25°C at 1,300 centistokes. The rubber produced was tested by holding a strip edgewise three-fourths inch above a Bunsen burner top and a 1½ inch high propane luminous flame for 12 seconds. The extinguishing time was 19 seconds.

EXAMPLE 9

Example 1 was repeated with the exception that 0.4 part of magnesium oxide was added to the gum instead of the zinc oxide. The flame retardancy of the rubber produced using this formulation using a propane flame at 1480°F had a self-extinguishing time of 9 seconds.

While the foregoing examples have of necessity been directed only to a few of the composition variables which are practicable in the practice of the present invention, it should be understood, however, that many other variables are within the scope of the present invention. The gums into which the synergistic flame retardant composition is added are not by necessity limited only to those specifically enumerated in the examples and may include all of the gums commonly used in the manufacture of silicone rubber. These gums include cyanoalkyl-substituted polysiloxanes and fluoroalkyl-substituted polysiloxanes, among others.

Having thus described the invention, what we desire to secure and claim by the United States patent is:

1. A composition of matter which in a cured state exhibits improved flame-retardant properties, the composition comprising:
   1. 100 parts of an organopolysiloxane gum convertible to the cured, solid, elastic state and consisting essentially of silicon atoms, oxygen atoms, and organic groups selected from the class consisting of methyl radicals, aromatic radicals selected from the class consisting of aryl and halogenated aryl radicals in an amount of from 0 to 35 mole per cent of the organic groups, and from 0 to 2 mole per cent of the total organic groups of vinyl radicals, there being from 1.98 to 2.05 organic groups per silicon atom,
   2. a finely divided, non-alkaline inorganic filler in an amount of from 10 to 300 parts, by weight,
   3. small, but effective amount to impart flame retardance of a platinum containing material not exceeding 250 parts per million by weight based on the organopolysiloxane gum, and
   4. a small but effective amount to improve flame retardancy of the above composition of a Group II metal oxide not to exceed 100 parts by weight based on the organopolysiloxane gum.

2. The cured product of claim 1.

3. The composition of claim 1 further characterized by the inorganic filler being present in an amount of from 40 to 125 parts.

4. The composition of claim 1 further characterized by the platinum-containing material being present in a range to provide from about 1 to about 25 parts per million, by weight based on the organopolysiloxane gum, of platinum.

5. The composition of claim 1 further characterized by the phenyl-to-silicon ratio being from about 0.01 to about 0.4.

6. The composition of claim 1 further characterized by the ratio of phenyl-to-silicon being from about 0.03 to about 0.1

7. The composition of claim 1 further characterized by the inorganic filler being fumed silica and the Group II metal oxide being zinc oxide.

8 The composition of claim 7 further characterized by the zinc oxide being present in an amount of from 1 to 15 parts.

9. The composition of claim 1 further characterized by from 0.01 to 1 part of magnesium oxide being present.

10. The composition of claim 1 further characterized by the ratio of phenyl groups to silicon in the polysiloxane being from about 0.01 to about 0.08.

11. A composition of matter which in a cured state exhibits improved flame-retardant properties, the composition comprising:
   1. 100 parts of an organopolysiloxane gum convertible to the cured, solid, elastic state and consisting essentially of silicon atoms, oxygen atoms, and organic groups selected from the class consisting of lower alkyl, cyano lower alkyl, and halo lower alkyl radicals in an amount of from 0 to 35 mole percent of the organic groups, and from 0 to 2 mole percent of the total organic groups of vinyl radicals, there being from 1.98 to 2.05 organic groups per silicon atom,
   2. a finely divided, non-alkaline inorganic filler in an amount of from 10 to 300 parts, by weight,
   3. small, but effective amount to impart flame retardancy of a platinum containing material not exceeding 250 parts per million by weight based on the organopolysiloxane gum, and
   4. a small but effective amount to improve flame retardancy of the above composition of a Group II metal oxide not to exceed 100 parts by weight based on the organopolysiloxane gum.

* * * * *